Patented Feb. 26, 1952

2,587,465

UNITED STATES PATENT OFFICE 2,587,465

SOLUTION POLYMERIZATION OF ACRYLONITRILE POLYMERS IN AQUEOUS ALCOHOL MIXTURES

George E. Ham and Earl C. Chapin, Dayton, Ohio, assignors to Monsanto Chemical Company, St. Louis, Mo., a corporation of Delaware No Drawing. Application October 26, 1948, Serial No. 56,672

12 Claims. (Cl. 260—85.5)

This invention relates to a novel and economical method of preparing the polymers of acrylonitrile which are especially suitable for fiber spinning operations. More particularly the invention relates to the preparation of polymers and copolymers of acrylonitrile in solution.

The conventional method of polymerization of acrylonitrile involves the polymerization in an aqueous solution, whereby the polymer is precipitated as solid particles suspended in aqueous medium. Because acrylonitrile is only slightly soluble in water the practice of this prior art method requires very high water to monomer ratios in order to insure uniform homogeneous solution of reagents. The practice also requires large reactor capacity, because of the excessive quantity of water present.

The purpose of this invention is to provide a new and useful method of polymerizing acrylonitrile. A further purpose of the invention is to provide a convenient and practicable method of preparing soluble acrylonitrile polymers which cannot be prepared by conventional polymerization methods. A still further purpose of the invention is to provide a method of minimizing the quantity of water present in the conventional acrylonitrile polymerizations.

In accordance with this invention acrylonitrile and mixtures of more than 70 percent of acrylonitrile and up to 30 percent of other monomers, such as methyl methacrylate, ethyl methacrylate, methyl acrylate, ethyl acrylate, acrylamide, methacrylamide, and methacrylonitrile, are polymerized in solution in an aqueous medium containing substantial proportions of lower aliphatic alcohols. Suitable alcohols for the practice of this invention are ethanol, methanol, isopropanol, n-propanol, and the monoethyl and monomethyl ethers of ethylene glycol and diethylene glycol. The invention may also be practiced with other alcohols having the structure:

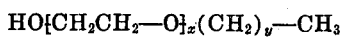

$$HO[CH_2CH_2-O]_x(CH_2)_y-CH_3$$

wherein $x$ and $y$ are integers from zero (0) to two (2), inclusive. The water alcohol solution will contain from 20 to 98 percent of water and 2 to 80 percent of one or more of the specified alcohols.

The polymerizations are conducted by heating the acrylonitrile, or the mixed monomers including acrylonitrile and one or more of the other polymerizable monomers specified, with the water alcohol mixture and subjecting it to suitable conditions for polymerization. To effect the polymerization water soluble peroxy catalysts are usually required, for example potassium persulfate, sodium peroxide, hydrogen peroxide, sodium persulfate, sodium perborate, sodium percarbonate, and other similar water soluble compounds containing the peroxy linkage (—O—O—)

From 0.01 to 3 percent by weight based on the polymerizable monomers has been found to catalyze the reaction effectively.

Although the polymerization will proceed under the conditions above described, it is desirable to activate the polymerization by the presence of reducing agents. These agents in cooperation with the peroxy compounds form a reduction-oxidation system which accelerates polymerization. This activation method is known to the art as a "redox" system. Although the mechanism of redox polymerization is not fully understood, it is believed that the added reducing agent supplies electrons to the peroxy compound, for example potassium persulfate and benzoyl peroxide, and causes a fission of the peroxy group (—O—O—) between the oxygen atoms, thereby yielding a higher concentration of free radical than would otherwise be possible in the normal peroxide decomposition. The free radicals are believed to initiate polymer chains by reaction with a monomer molecule accompanied by the release of another free radical. Thus the polymerization is continued at an accelerated rate until the monomer supply is depleted. Activation of the polymerization by the redox method may be practiced at unusually low temperatures. Accordingly, the method of this invention may be operated at temperatures between 0° C. and —30° C., thereby forming higher molecular weight polymers than can be achieved at higher temperatures of 20 to 80° C.

Valuable reducing agents for use in practicing this invention by means of the redox method, are the water soluble salts of the oxygen acids of sulfur in lower valent form and capable of oxidation to a higher valent form. Suitable activators are the bisulfites, meta-bisulfites, and sulfites, and particularly the alkali metal salts of said acids. From 0.01 to 4 percent by weight of said activators may be used.

The polymerization is initiated by charging the monomers and a desirable proportion of the water-alcohol mixture into a suitable reactor. From 100 to 500 percent by weight of the water-alcohol mixture, based on the polymerizable monomer, will produce effective reaction mixtures. As the polymerization proceeds the polymer formed is precipitated in finely divided state having uniform particle size and other physical properties. The copolymers so formed have uniform chemical and physical properties, this being especially important in the case of fiber fabrication.

The new acrylonitrile polymers and copolymers are especially effective when used in fiber drawing operations by the solvent extrusion method, in which the polymer is dissolved in a suitable solvent, for example dimethyl formamide, ethylene carbonate, butyrolactone, dimethylacetamide, β-propiolactone, and other similar solvents known to be solvents for high acrylonitrile polymers. Copolymers of acrylonitrile and the various comonomers enumerated above, the acrylates, methacrylates and methacrylonitrile are very difficultly soluble or insoluble when prepared by conventional emulsion polymerization techniques. When these copolymers are prepared in accordance with the method described and claimed herein they are readily soluble to form extrudable mixtures useful in the preparation of high tenacity fibers Further details of the invention are set forth with respect to the following specific examples.

Example 1

A reaction vessel was charged with 2850 parts by weight of acrylonitrile, 150 parts of methyl acrylate, 7500 parts of water, 7500 parts of methanol, 15 parts of potassium persulfate, and seven and one-half parts of sodium bisulfite and allowed to react by maintaining a temperature of 60° C. The reaction was substantially complete in two hours. The resulting polymer was filtered, washed with methyl alcohol and dried. An 18 percent soultion of this resin was prepared in dimethyl formamide and the resulting solution extruded into a water bath through a spinneret having thirty orifices each 0.005 inch in diameter to form a fiber. After stretching the fiber 750 percent by heating to 160° C., in glycerine, a fiber having 3.0 grams per denier tenacity, an 82 to 87 percent wet strength, a 4 to 5 percent elongation, and a 14 percent boil shrinkage was obtained.

Example 2

Using the procedure described in Example 1, 570 parts by weight of acrylonitrile, 30 parts of acrylamide, were polymerized in a solvent medium comprising 2000 parts of water and 1172 parts of methanol. The polymerization was catalyzed with 3 parts by weight of potassium persulfate and 1.5 parts of sodium bisulfite was present to reduce the catalyst. The reaction was conducted at −20° C. and a substantially complete polymerization was effected in eight hours. The resin was recovered by filtering the reaction mass.

The polymer was dissolved in dimethyl formamide to form a 17 percent solution which was extruded as described in the preceding example to form a fiber. The freshly prepared fiber was stretched 5.93 times in a glycerine bath at 160° C. and the resulting fiber had a tenacity of 2.6 grams per denier.

Example 3

Using the procedure described in Example 1, a mixture of 540 parts by weight of acrylonitrile and 60 parts of methacrylonitrile were polymerized at 60° C. in three hours in a solvent mixture of 900 parts of water and 140 parts of methanol in the presence of 1.5 parts of sodium bisulfite and 3 parts of potassium persulfate. The resulting polymer was fabricated into a fiber by extruding it from a 16 percent solution of dimethyl formamide. The fiber so produced was stretched 500 percent in a 180° C. glycerine bath and was found to have a 4.2 gram per denier strength and a 3 to 10 percent elongation.

Example 4

Using the procedure described in Example 1, 2700 parts by weight of acrylonitrile, 300 parts of methacrylonitrile, 4500 parts of water, 4500 parts of methanol, 9 parts of potassium persulfate, and 4 parts of sodium bisulfite were polymerized. Fibers were prepared by extruding a 15 percent solution in dimethyl formamide.

Example 5

Using the procedure described in Example 1, a mixture of 2250 parts by weight of acrylonitrile, 750 parts of methacrylonitrile, 200 parts of water, 1880 parts of methanol, 15 parts of potassium persulfate and 7.5 parts of sodium bisulfite were polymerized at 25° C., in a period of 48 hours and the resulting polymer was extruded into a water bath from an 11 percent solution in dimethyl formamide to form the fibers.

Example 6

Using the procedure described in Example 1, 400 parts by weight of acrylonitrile, 1400 parts of water, 1400 parts of methanol, 2 parts of potassium persulfate and one part of sodium bisulfite were polymerized in twenty-four hours at 25° C. The copolymer so formed was soluble in dimethyl formamide.

Example 7

Using the procedure described in Example 1, 1425 parts by weight of acrylonitrile and 75 parts of methyl methacrylate were polymerized in the presence of 2250 parts of water, 2250 parts of methyl alcohol, 4.5 parts of potassium persulfate and 2.5 parts of sodium bisulfite. A temperature of 40° C. and a reaction period of forty-eight hours were employed. A copolymer of 88.5 percent acrylonitrile was thereby produced which was soluble in dimethyl formamide.

The invention is defined by the following claims:

What is claimed is:

1. A method of preparing acrylonitrile polymers of a monomeric composition of which at least 70 per cent of the monomer content is acrylonitrile, which comprises dissolving the monomers in a mixture of 20 to 98 per cent water and two to 80 per cent of a compound having the structural formula

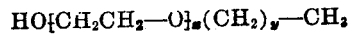

wherein $x$ and $y$ are integers from zero (0) to two (2) inclusive, said mixture being from 100 to 500 per cent of the monomeric composition, contacting the solution with from 0.01 to three per cent by weight of water soluble peroxy compound and from 0.1 to five per cent by weight of a water soluble salt of an oxygen acid of sulfur in a lower valent form.

2. The method defined by claim 1 wherein the monomeric composition consists entirely of acrylonitrile.

3. The method defined by claim 1 wherein the monomeric composition consists of a mixture of at least 70 per cent acrylonitrile and up to 30 per cent methyl methacrylate.

4. The method defined by claim 1 wherein the monomeric composition consists of a mixture of at least 70 per cent acrylonitrile and up to 30 per cent of methacrylonitrile.

5. The method defined by claim 1 wherein the monomeric composition consists of a mixture of at least 70 per cent acrylonitrile and up to 30 per cent methyl acrylate.

6. The method defined by claim 1 wherein the monomeric composition consists of a mixture of at least 70 per cent acrylonitrile and up to 30 per cent of ethyl acrylate.

7. A method of preparing acrylonitrile polymers of a monomeric composition of which at least 70 per cent of the monomer content is acrylonitrile, which comprises dissolving the monomers in a mixture of 20 to 98 per cent water and two to 80 per cent of methyl alcohol, said mixture being from 100 to 500 per cent of the monomeric composition, contacting the solution with from 0.01 to three per cent by weight of water soluble peroxy compound and from 0.1 to five per cent by weight of sodium bisulfite.

8. The method defined by claim 7 wherein the monomeric composition consists entirely of acrylonitrile.

9. The method defined by claim 7 wherein the monomeric composition consists of a mixture of at least 70 per cent of acrylonitrile and up to 30 per cent of methyl methacrylate.

10. The method defined by claim 7 wherein the monomeric composition consists of a mixture of at least 70 per cent of acrylonitrile and up to 30 per cent of methacrylonitrile.

11. The method defined by claim 7 wherein the monomeric composition consists of a mixture of at least 70 per cent of acrylonitrile and up to 30 per cent of methyl acrylate.

12. The method defined by claim 7 wherein the monomeric composition consists of a mixture of at least 70 per cent of acrylonitrile and up to 30 per cent of ethyl acrylate.

GEORGE E. HAM.
EARL C. CHAPIN.

REFERENCES CITED

The following references are of record in the file of this patent:

UNITED STATES PATENTS

| Number | Name | Date |
| --- | --- | --- |
| 2,135,443 | Strain | Nov. 1, 1938 |
| 2,436,926 | Jacobson | Mar. 2, 1948 |
| 2,453,788 | Fallows et al. | Nov. 16, 1948 |
| 2,456,360 | Arnold | Dec. 14, 1948 |
| 2,462,354 | Brubaker et al. | Feb. 22, 1949 |
| 2,486,241 | Arnold | Oct. 25, 1949 |